United States Patent
Allen et al.

(10) Patent No.: US 7,663,571 B2
(45) Date of Patent: *Feb. 16, 2010

(54) TIME-LAPSING MIRROR

(75) Inventors: Paul G. Allen, Seattle, WA (US);
Edward K. Y. Jung, Bellevue, WA (US);
Royce A. Levien, Lexington, MA (US);
Mark A. Malamud, Seattle, WA (US);
John D. Rinaldo, Jr., Bellevue, WA (US)

(73) Assignee: Searete LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/981,805

(22) Filed: Oct. 30, 2007

(65) Prior Publication Data

US 2008/0130148 A1 Jun. 5, 2008

Related U.S. Application Data

(63) Continuation-in-part of application No. 11/638,305, filed on Dec. 12, 2006, and a continuation-in-part of application No. 10/910,421, filed on Aug. 2, 2004, now Pat. No. 7,283,106.

(51) Int. Cl.
*G09G 3/00* (2006.01)
(52) U.S. Cl. .......................... 345/32; 345/156
(58) Field of Classification Search .......... 345/8, 345/32, 156; 132/301; 434/371; D28/64.1
See application file for complete search history.

(56) References Cited

U.S. PATENT DOCUMENTS

| | | | |
|---|---|---|---|
| 3,838,525 A | 10/1974 | Harvey | |
| 3,934,226 A | 1/1976 | Stone et al. | |
| 4,309,094 A | 1/1982 | Bollen | |
| 5,198,936 A | 3/1993 | Stringfellow | |
| 5,997,149 A | 12/1999 | Chu | |
| 6,032,119 A | 2/2000 | Brown et al. | |
| 6,071,236 A | 6/2000 | Iliff | |
| 6,077,225 A | 6/2000 | Brock-Fisher | |
| 6,095,985 A | 8/2000 | Raymond et al. | |
| 6,120,467 A | 9/2000 | Schallhorn | |
| 6,238,337 B1 | 5/2001 | Kambhatla et al. | |
| 6,272,468 B1 | 8/2001 | Melrose | |
| 6,322,502 B1 | 11/2001 | Schoenberg et al. | |
| 6,336,900 B1 | 1/2002 | Alleckson et al. | |
| 6,402,689 B1 | 6/2002 | Scarantino et al. | |
| 6,440,090 B1 | 8/2002 | Schallhorn | |
| 6,454,708 B1 | 9/2002 | Ferguson et al. | |
| 6,468,263 B1 | 10/2002 | Fischell et al. | |
| 6,477,394 B2 | 11/2002 | Rice et al. | |
| 6,516,210 B1 | 2/2003 | Foxall | |
| 6,542,204 B1 | 4/2003 | Ohzawa et al. | |
| 6,556,977 B1 | 4/2003 | Lapointe et al. | |

(Continued)

FOREIGN PATENT DOCUMENTS

| | | |
|---|---|---|
| JP | 05181216 A2 | 7/1993 |
| JP | 06055957 A2 | 3/1994 |
| WO | WO 02/080773 A1 | 10/2002 |

OTHER PUBLICATIONS

U.S. Appl. No. 12/220,671, Allen et al.

(Continued)

*Primary Examiner*—Ricardo L Osorio

(57) ABSTRACT

Time-lapsing mirror methods and related systems.

14 Claims, 12 Drawing Sheets

U.S. PATENT DOCUMENTS

| | | | |
|---|---|---|---|
| 6,569,094 B2 | 5/2003 | Suzuki et al. | |
| 6,574,742 B1 | 6/2003 | Jamroga et al. | |
| 6,678,703 B2 | 1/2004 | Rothschild et al. | |
| 6,710,927 B2 | 3/2004 | Richards | |
| 6,725,200 B1 | 4/2004 | Rost | |
| 6,746,122 B2 | 6/2004 | Knox | |
| 6,755,539 B2 | 6/2004 | Brennesholtz | |
| 6,757,087 B1 | 6/2004 | Taketomi et al. | |
| 6,760,515 B1 | 7/2004 | Wang et al. | |
| 6,761,458 B2 | 7/2004 | Sakata et al. | |
| 6,762,870 B2 | 7/2004 | De Vaan | |
| 6,768,915 B2 | 7/2004 | Brand et al. | |
| 6,774,869 B2 | 8/2004 | Biocca et al. | |
| 6,869,772 B2 | 3/2005 | Lichtman et al. | |
| 7,080,910 B2 | 7/2006 | Engle | |
| 7,133,003 B2 | 11/2006 | Allen et al. | |
| 7,259,731 B2 | 8/2007 | Allen et al. | |
| 7,259,732 B2 | 8/2007 | Allen et al. | |
| 7,283,106 B2 | 10/2007 | Allen et al. | |
| 2001/0031081 A1 | 10/2001 | Quan et al. | |
| 2001/0037191 A1* | 11/2001 | Furuta et al. | 703/6 |
| 2002/0196333 A1 | 12/2002 | Gorischek | |
| 2003/0041871 A1 | 3/2003 | Endo et al. | |
| 2004/0095359 A1 | 5/2004 | Simon et al. | |
| 2005/0027567 A1 | 2/2005 | Taha | |
| 2005/0035313 A1 | 2/2005 | Garssen et al. | |
| 2005/0174473 A1* | 8/2005 | Morgan et al. | 348/370 |
| 2005/0185278 A1 | 8/2005 | Horsten et al. | |
| 2006/0017605 A1 | 1/2006 | Lovberg et al. | |

OTHER PUBLICATIONS

U.S. Appl. No. 12/154,694, Allen et al.
U.S. Appl. No. 11/982,731, Allen et al.
U.S. Appl. No. 11/982,396, Jung et al.
U.S. Appl. No. 11/982,326, Allen et al.
U.S. Appl. No. 11/726,114, Allen et al.
U.S. Appl. No. 11/639,366, Jung et al.
U.S. Appl. No. 11/540,928, Allen et al.
U.S. Appl. No. 11/478,334, Allen et al.
U.S. Appl. No. 10/972,319, Allen et al.
U.S. Appl. No. 10/951,002, Rinaldo Jr. et al.
U.S. Appl. No. 10/941,803, Levien et al.
U.S. Appl. No. 10/912,271, Rinaldo Jr. et al.
PCT International Search Report; International App. No. PCT/US05/27411; Jul. 7, 2008; pp. 1-2.
Azuma, Ronald; Baillot, Yohan; Behringer, Reinhold; Feiner, Steven; Julier, Simon; MacIntyre, Blair; "Recent Advances in Augmented Reality," pp. 34-47; located at www.cs.unc.edu/~azuma/cga2001.pdf; bearing a date of Nov./Dec. 2001; printed on Jul. 12, 2004.
Butz, Andreas; Beshers, Clifford; Feiner, Steven; "Of Vampire Mirrors and Privacy Lamps: Privacy Management in Multi-User Augmented Environments," pp. 171-172; located at http://wwwl.cs.columbia.edu/~butz/publications/papers/uist98.pdf; bearing a date of Nov. 2-4, 1998; printed on Jul. 12, 2004.
Computer Vision & Robotics Laboratory Beckman Institute, "Multiview Mirror Pyramid Panoramic Cameras," Tan, Kar-Han; Hua, Hong; Ahuja, Narendar from the Beckman Institute for Advanced Science and Technology, University of Illinois at Urbana-Champaign, pp. 1-4 located at http://vision.ai.uiuc.edu/~tankh/Camera/camera.html printed on Aug. 9, 2004.
Francois, Alexandre R.J.; Kang, Elaine; "The Virtual Mirror," pp. 1-5; located at http://iris.usc.edu/~afrancoi/virtualmirror/; printed on Jul. 12, 2004.
Fulford, Benjamin, "Adventures in the Third Dimension" pp. 1-3 located at www.forbes.com/forbes/2004/0524/166_print.html bearing a date of May 24, 2004 and printed on Sep. 1, 2004.
Healthy Style Products, "Emjoi—The Mirror AP-13," pp. 1-2 located at http://www.healthystyleproducts.com/mirror.html printed on Sep. 1, 2004.
Highbeam Research; "Winntech. (Globalshop 2003 Spotlight);" pp. 1; located at http://www.highbeam.com/library/doc0.asp?docid=1G1:99048681&refid=ink_g5sl&skeyw; printed on Jul. 12, 2004.
Lin, I-Chen; Yeh, Jeng-Sheng; and Ouhyoung, Ming from National Taiwan University, "Extracting 3D Facial Animation Parameters from Multiview Video Clips," pp. 2-10, bearing a date of Nov./Dec. 2002 and printed on Sep. 1, 2004.
Lin, I-Chen, "The Software Tool of Mass 3D Facial Animation Parameter Extraction from Mirror-Reflected Multi-View Video User's Instruction Version 1.0," located at http://www.cmlab.csie.ntu.edu.tw/~ichen, pp. 1-24 (+ cover sheet), printed on Sep. 1, 2004.
Morimoto, Carlos Hitoshi; "Interactive Digital Mirror," from XIV Brazilian Symposium on Computer Graphics and Image Processing (SIBGRAPI'01), Oct. 15-18, 2001; pp. 1; located at http://csdl.computer.org/comp/proceeding/sibgrapi/2001/1330/00/13300232abs.htm; bearing a date of 2001; printed on Jul. 12, 2004.
Nextag, "Accessories—compare prices, review and buy at NexTag—Price—Review re Jerdon Mirror,"pp. 1-2 located at http://www.nextag.com/
Jerdon_Accessories~2702144zJerdonz0zB36ozmainz5-htm
printed on Aug. 9, 2004.
NP Review.Info, "New Product Reviews: New Product Review—Jerdon JGL9W 5X Magnification Tri-fold Lighted Mirror Product Review," pp. 1-3 located at http://www.npreview.info/Home-and-Garden/Home-Decor/Mirrors/Vanity-Mirrors/Jerdon-JGL9W-5X-Magnification-Tri-fold-Lighted-Mirror.html printed on Sep. 1, 2004.
PCT International Search Report; International App. No. PCT/US05/27410; Jan. 27, 2006.
PCT International Search Report; International App. No. PCT/US05/27250; May 2, 2006.
PCT International Search Report; International App. No. PCT/US05/27249; Apr. 21, 2006.
PCT International Search Report; International App. No. PCT/US05/27256; Apr. 21, 2006.
Radford, Tim, "Mirror, Mirror on the Wall, Who'll Be Fattest of Them All?", The Guardian Unlimited, bearing a date of Feb. 3, 2005, pp. 1-4, located at http://www.guardian.co.uk/uk_news/story/0,3604,1404636,00.html, printed on Feb. 4, 2005.
Riviere, Cameron; Taylor, Russ; Digioia, A.; Wenz, J.; Kostuik, J.; Frassica, F.; "Engineered System Family #3: Information-enhanced Minimally Invasive Surgery," pp. 1-12; located at http://cisstweb.cs.jhu.edu/research/InfoEnhMIS/InfoEnhMISMain.htm; printed on Jul. 12, 2004.
Rochester Institute of Technoloy; "Introduction to Augmented Reality," pp. 1-12; located at http://www.se.rit.edu/~jrv/research/ar/introduction.html; printed on Jul. 12, 2004.
Siggraph Emerging Technologies 1991-2002; "Interactive Paradigm, Technique," pp. 1-5; located at http://www.siggraph.org/~fujii/etech/s_interactive.html; bearing a date of Jul. 5, 2002; printed on Jul. 12, 2004.
Siggraph Emerging Technologies 1991-2002; "Magic Morphin Mirror: Face-Sensitive Distortion and Exaggeration," pp. 1-2; located at http://www.siggraph.org/~jujii/etech/1997_190.html; bearing a date of Jul. 5, 2002; printed on Jul. 12, 2004.
Spohrer, J.C.; "Information in places," from vol. 38, allegedly of No. 4, 1999, Pervasive Computing; pp. 1-25; located at http://www.research.ibm.com/journal/sj/384/spohrer.html; printed on Jul. 12, 2004.
Sturm, Peter, "Mixing Catadioptric and Perspective Cameras," pp. 1-8, located at http://www.inrialpes.fr/movi/people/Sturm bearing a date of 2002 and printed on Sep. 1, 2004.
Tan, Kar-Han; Hua, Hong, Ahuja, Narenda "Multiview Panoramic Cameras Using Mirror Pyramids," accepted for publication in the IEEE Transactions on Pattern Analysis and Machine Intelligence journal, pp. 1-19 (+ cover sheet), printed on Sep. 1, 2004.
Taniguchi, Rin-Ichiro, "Real-Time Multiview Image Analysis and Its Application," pp. 1-8 printed on Sep. 1, 2004.
The Swiss Technorama Science Center, "Mirrors in Mind: Mirror, Mirror, on the Wall," pp. 1-12, located at http://www.technorama.ch/rentals/description.html printed on Sep. 1, 2004.
Traxtal; "What is Augmented Reality," pp. 1-2; located at http://www.traxtal.com/rd/rd_classroom_augmentedreality.htm; printed on Jul. 12, 2004.

* cited by examiner

TIME-LAPSING MIRROR

CROSS REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 Usc 119(e) for provisional patent applications, for any and all parent, grandparent, great-grandparent, etc. applications of the Related Application(s)).

RELATED APPLICATIONS

1. For purposes of the USPTO extra-statutory requirements, the present application constitutes a continuation-in-part of U.S. patent application Ser. No. 10/910,421 now U.S. Pat. No. 7,283,106, entitled Time-Lapsing Mirror, naming Paul G. Allen; Edward K. Y. Jung; Royce A. Levien; Mark A. Malamud; John D. Rinaldo, Jr. as inventors, filed 2 Aug. 2004, which is currently co-pending, or is an application of which a currently co-pending application is entitled to the benefit of the filing date.

2. For purposes of the USPTO extra-statutory requirements, the present application constitutes a continuation-in-part of U.S. patent application Ser. No. 11/638,305, entitled Time-Lapsing Mirror, naming Paul G. Allen; Edward K. Y. Jung; Royce A. Levien; Mark A. Malamud; John D. Rinaldo, Jr. as inventors, filed 12 Dec. 2006, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og./2003/week11/patbene.htm. The present Applicant has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Application and of any and all parent, grandparent, great-grandparent, etc. applications of the Related Applications is incorporated herein by reference to the extent such subject matter is not inconsistent herewith.

TECHNICAL FIELD

The present application relates, in general, to mirror technologies.

SUMMARY

In one aspect, a system includes but is not limited to a physical mirror; an image playback device proximate to said physical mirror; and an image registration engine operably couplable to said image playback device. In addition to the foregoing, other system aspects are described in the claims, drawings, and text forming a part of the present application.

In one aspect, a system includes but is not limited to a physical mirror; an image capture device having an image field corresponding to said physical mirror; and at least one image storage device operably couplable with said image capture device. In addition to the foregoing, other system aspects are described in the claims, drawings, and text forming a part of the present application.

In one aspect, a method includes but is not limited to accepting input related to an image in a mirror; and presenting one or more stored images having at least a part of the image in the mirror. In addition to the foregoing, other method aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the detailed description set forth herein.

DETAILED DESCRIPTION

Figure 1:
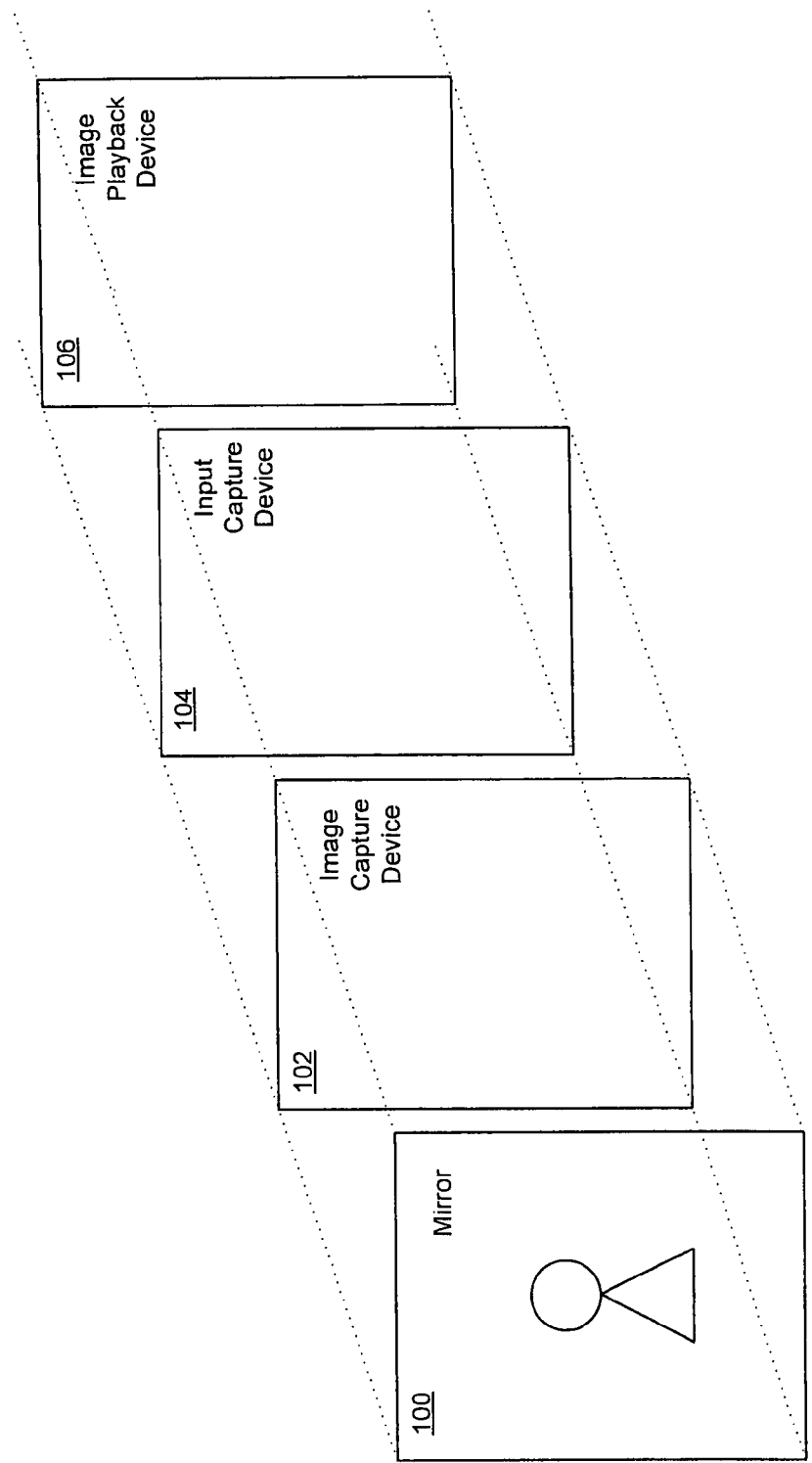
FIG. 1 shows a partial view of a system that may serve as an illustrative environment of and/or for subject matter technologies.

With reference to the figures, and with reference now to FIG. 1, shown is a partial view of a system that may serve as an illustrative environment of and/or for subject matter technologies. Depicted are mirror 100, image capture device 102, input capture device 104, and image playback device 106. In one exemplary implementation, mirror 100 can be a plane mirror, a convex mirror, and/or a concave mirror. Examples of such mirrors may include bathroom, hall, and/or handheld mirrors. In another exemplary implementation, mirror 100 can be a partially silvered mirror. In some exemplary implementations, mirror 100 can be a physical mirror. In other exemplary implementations, mirror 100 can be a digital mirror and/or a projection mirror. In yet other implementations, mirror 100 can be a combination of one or more physical mirrors and/or one or more digital mirrors and/or one or more projection mirrors. In some implementations, image playback device 106 may present various types of time-lapse information in addition or in the alternative to image information, such as height and/or weight information. In some implementations, presentations of information may be in the form of various modalities including but not limited to graphs, tables, audio (speech, music, sound), text, email (e.g. a weekly digest), et cetera.

Continuing to refer to FIG. 1, illustrated is image playback device 106 proximate to mirror 100. One exemplary implementation of image playback device 106 proximate to mirror 100 includes but is not limited to image playback device 106 integral with physical mirror 100. Another exemplary implementation of image playback device 106 proximate to mirror 100 includes but is not limited to image playback device (106) operably coupled with physical mirror 100 (e.g., as used herein, proximate may mean operationally proximate—able to work and interact together either directly or through intermediate components—as well as and/or in addition to physically proximate and/or mechanically proximate). Yet another exemplary implementation of image playback device 106 proximate to mirror 100 includes but is not limited to image playback device 106 in physical communication with physical mirror 100. One exemplary implementation of image playback device 106 in physical communication with physical mirror 100 includes but is not limited to image playback device 106 connected with a frame connected with said physical mirror 100. In some implementations, image playback device 106 can be a light generation device (e.g., a plasma display and/or a liquid crystal display), an image presentation device (e.g., a direct projection to the eye retinal display), and/or a laser device (e.g., a laser diode device).

Figure 2:
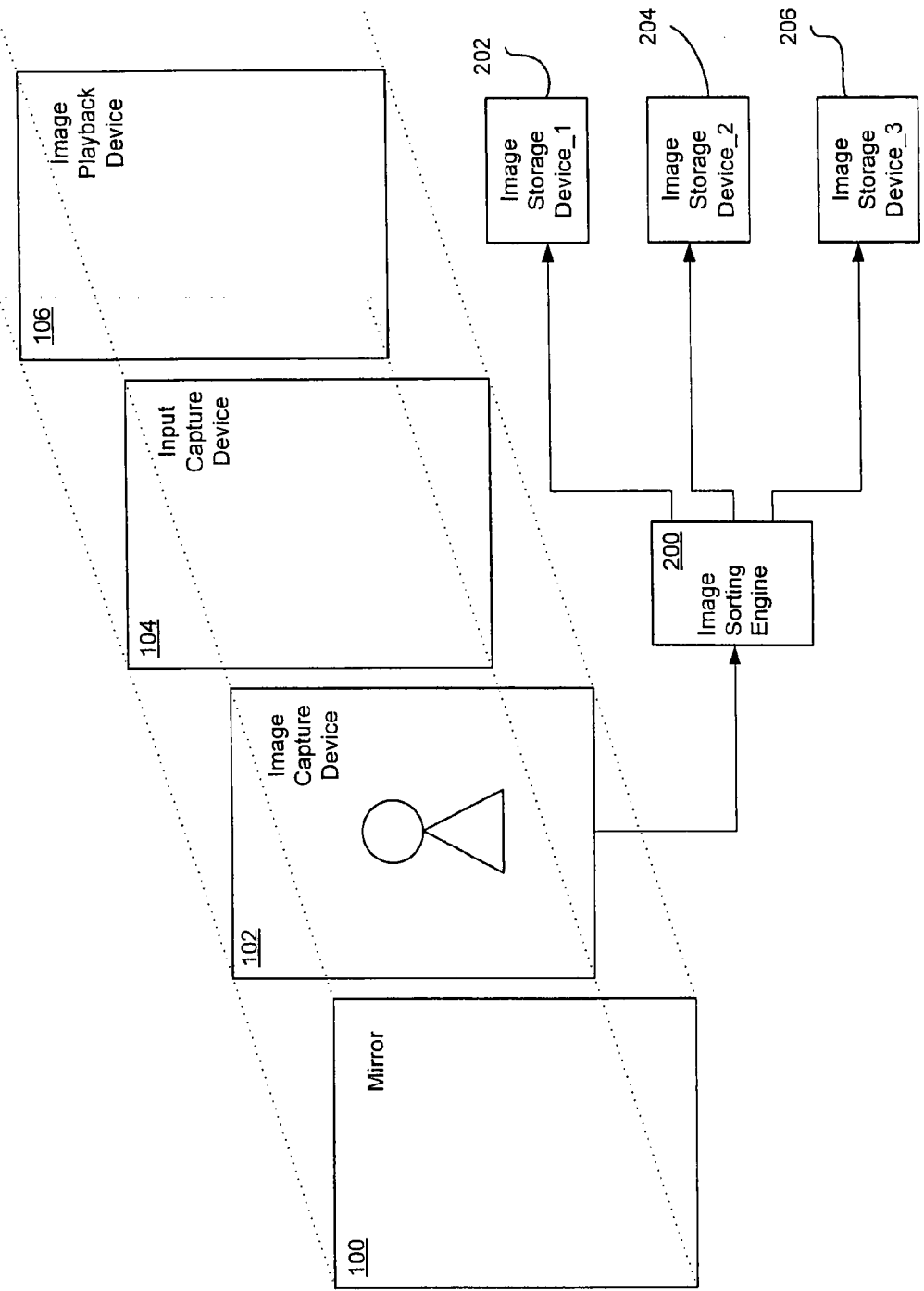
FIG. 2 depicts a partial view of a system that may serve as an illustrative environment of and/or for subject matter technologies.

Referring now to FIG. 2, depicted is a partial view of a system that may serve as an illustrative environment of and/or for subject matter technologies. Illustrated is that image sorting engine 200 interfaces with image capture device 102. Shown is that image sorting engine 200 interfaces with image storage device_1 202, image storage device_2 204, and image storage device_3 206. In one exemplary implementation, image sorting engine 200 receives images from image capture device 102 and sorts the received images into one or more of image storage device_1 202, image storage device_2 204, and image storage device_3 206 based on pattern recognition algorithms. For example, in an implementation where image capture device 102 is capturing three-dimensional (3-D) images of a human subject, image sorting engine 200 may utilize 3-D image processing routines to sort various recognized captured images into image storage device_1 202, image storage device_2 204, and image storage device_3 206 (e.g., where images of a first person are sorted to image storage device_1 202, images of a second person are sorted to image storage device_2 204, and images of a third person are sorted to image storage device_3 206). Those skilled in the art will appreciate that, as used herein, sorting can include categorization, ordering, and/or other operations such as those described herein.

Continuing to refer to FIG. 2, in one implementation, image capture device 102 can include at least one image representation device located to capture a field of view of mirror 100. For example, an active photo-detector array completely and/or partially in identity with a display portion of mirror 100 or a lensed image capture system oriented such that it could capture all or part of an image reflected from mirror 100. In another exemplary implementation, image capture device 102 can include at least two image representation devices located to capture a field of view of mirror 100. For example, two or more camera systems positioned to capture stereo imagery such that 3-D imaging techniques may be applied. The image capture devices described herein can be positioned substantially anywhere an image of mirror 100 can be captured, such as behind mirror 100 in order to catch transmitted images through a partially silvered mirror, to the sides and/or above and/or below a mirror, and/or positioned and/or oriented to the front of a mirror in order to record images reflected from a mirror. In some implementations, the image capture devices may also be positioned such that they reside behind where a user would be expected to stand when viewing mirror 100.

Figure 3:
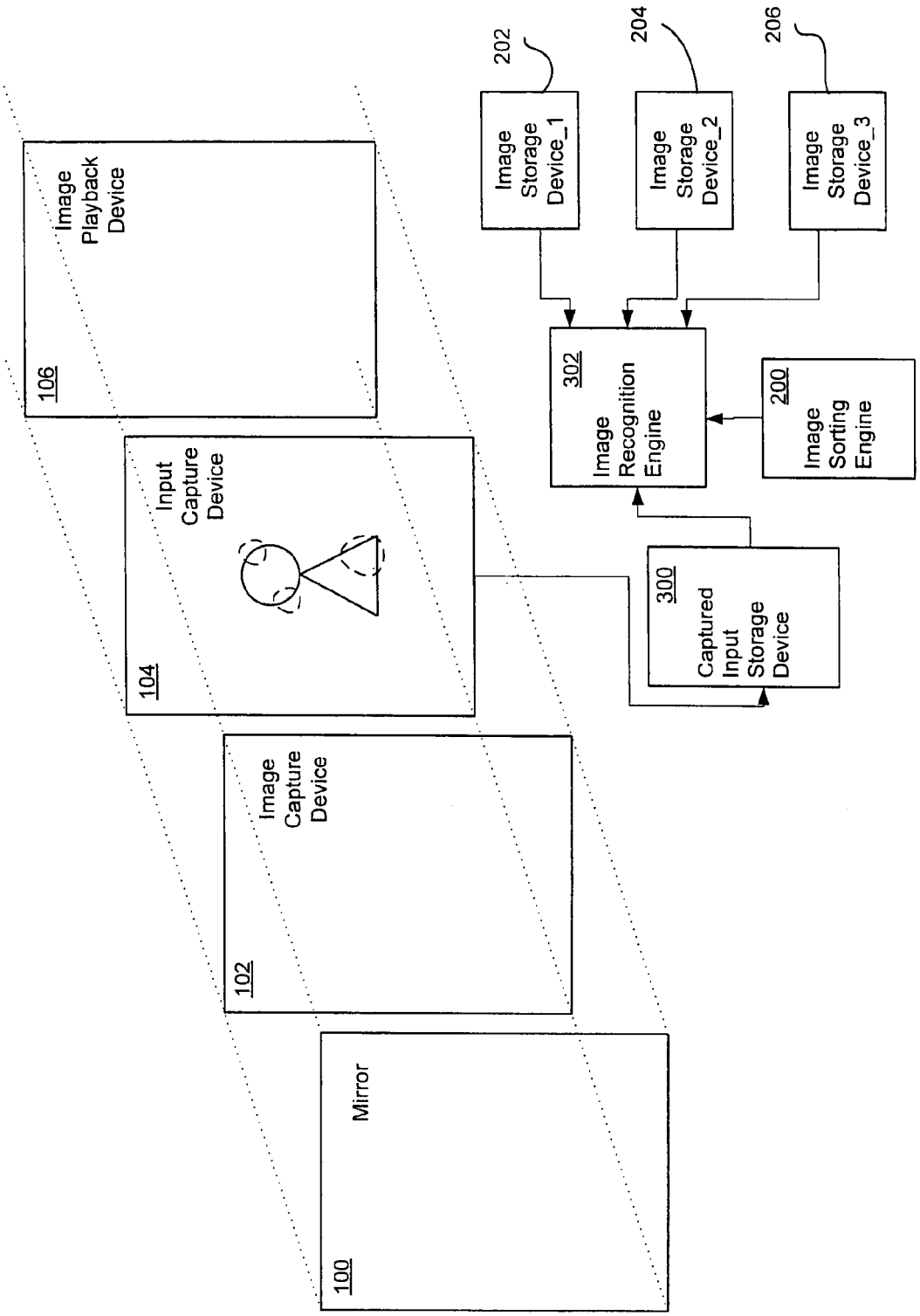
FIG. 3 illustrates a partial view of a system that may serve as an illustrative environment of and/or for subject matter technologies.

With reference now to FIG. 3, illustrated is a partial view of a system that may serve as an illustrative environment of and/or for subject matter technologies. Shown is captured input storage device 300 exchanging signals with input capture device 104. Depicted is image recognition engine 302 exchanging signals with captured input storage device 300, image sorting engine 200, image storage device_1 202, image storage device_2 204, and image storage device_3 206. In one exemplary implementation, a user (e.g., a human user) touches and/or circles a region of an image in mirror 100 and asks that the system show a time-lapse presentation of the region over some interval of time. For example, a human user touching a skin lesion on his/her image and asking that the system show the mole over the last three months. In response, in one implementation captured input storage device 300 captures both the region of the image touched as well as the request for the time-lapse presentation of the mole (in some implementations, the request is typed such as via touch screen entry to a menu driven system, while in other implementations, the request is spoken such as via voice recognition input driven system). Thereafter, in one implementation, image recognition engine 302 interacts with image sorting engine 200 to determine where images associated with the person whose input has been captured are stored. For example, if the person in the mirror's previously captured images had been stored in image storage device_3 206, then image sorting engine 200 would inform image recognition engine 302 of that fact. Thereafter, image recognition engine 302 would know the storage location of that person's image.

Figure 4:
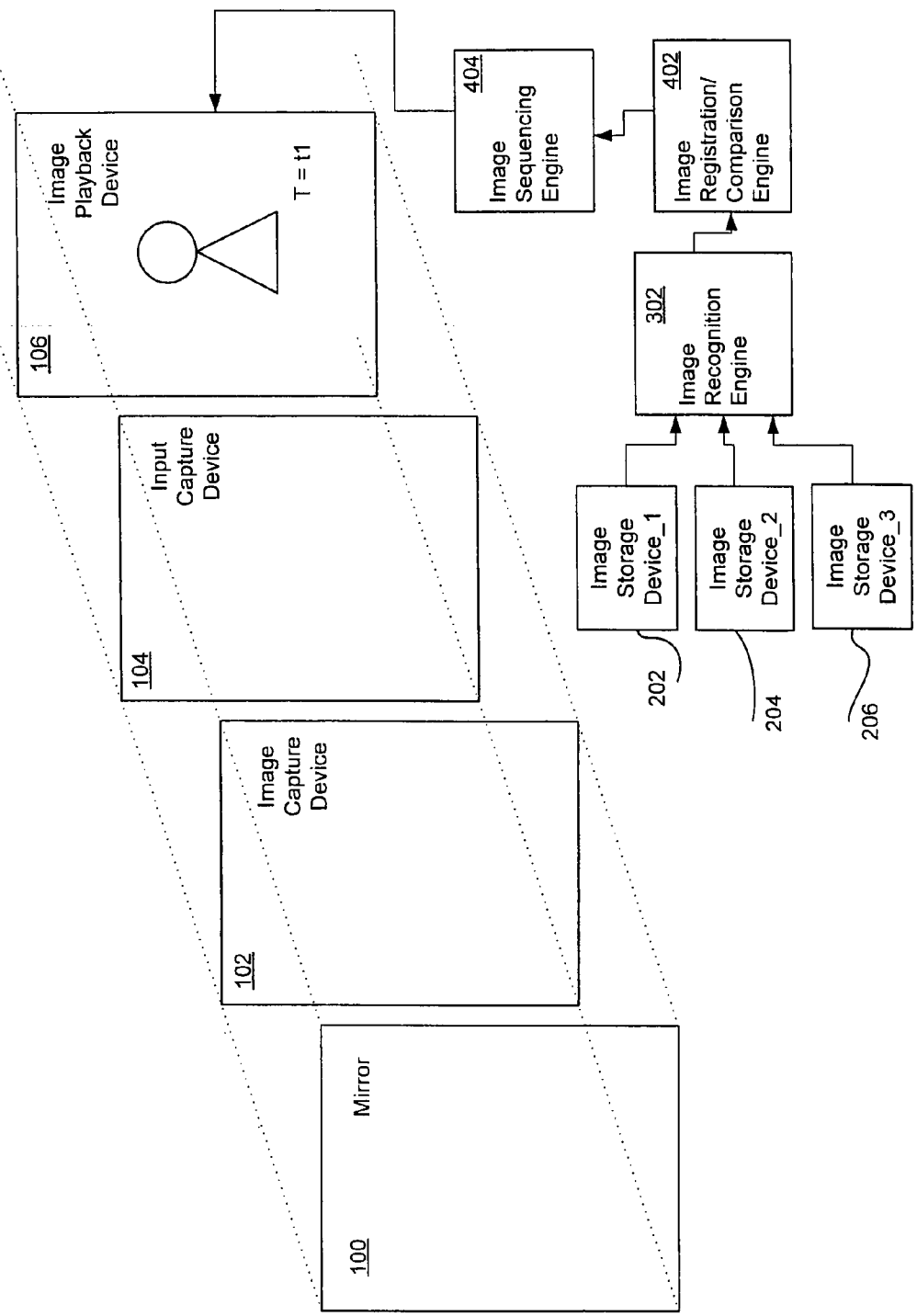
FIG. 4 shows a partial view of a system that may serve as an illustrative environment of and/or for subject matter technologies.

Referring now to FIG. 4, shown is a partial view of a system that may serve as an illustrative environment of and/or for subject matter technologies. Depicted is image recognition engine 302 interfaced with image sorting engine 200, image storage device_1 202, image storage device_2 204, and image storage device_3 206. Illustrated is image recognition engine 302 interfaced with image registration/comparison engine 402. Shown is image registration/comparison engine 402 interfaced with image sequencing engine 404. In one exemplary implementation, image recognition engine 302 retrieves time-sequenced images from one or more of image storage device_1 202, image storage device_2 204, and image storage device_3 206. Thereafter, image registration/comparison engine 402 uses some relatively stable image feature(s), such as anatomical landmarks (e.g., bony regions or a center part of some defined anatomical feature), to encompass and or localize a region of interest where some feature of interest resides, to provide proper alignment. Image sequencing engine 404 then presents the aligned images in a time sequenced fashion such that the changes in the region of interest can be viewed over time. For instance, a time-lapse presentation of how a mole has grown over the last few months.

In some implementations, instead of or as an addition to the foregoing, image registration/comparison engine 402 compares a specified feature (e.g., hair length or jowl size) against a reference value and presents information (e.g., an alert) when the specified feature exceeds the reference value by some defined amount. As a specific example, a user might instruct the system to alert her if her hair has grown more than 8 millimeters beyond some reference length. If her hair did exceed the threshold beyond the reference length, the system would present a display indicating that event, and perhaps suggesting that a haircut was needed.

Figure 5:
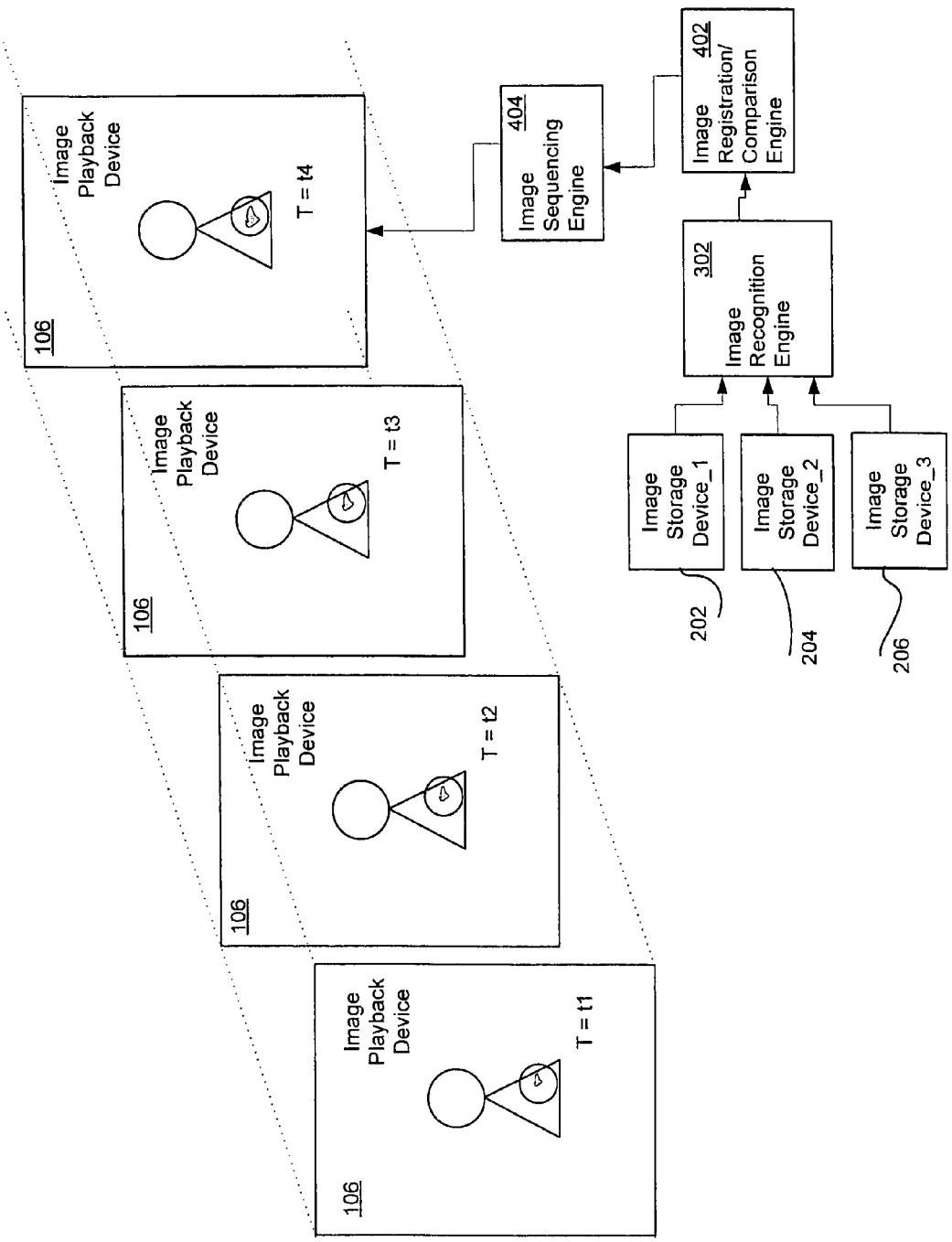
FIG. 5 depicts a partial view of a system that may serve as an illustrative environment of and/or for subject matter technologies.

With reference now to FIG. 5, depicted is a partial view of a system that may serve as an illustrative environment of and/or for subject matter technologies. Illustrated is the system presenting four (4) time sequenced views showing the growth of lesion within a skin region over time. Depicted is that the lesion is dark with an irregular border and growing, such as, for example, a melanoma region. Other things could be like depicted, like hair length, jowl size, etc.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations.

Figure 6:
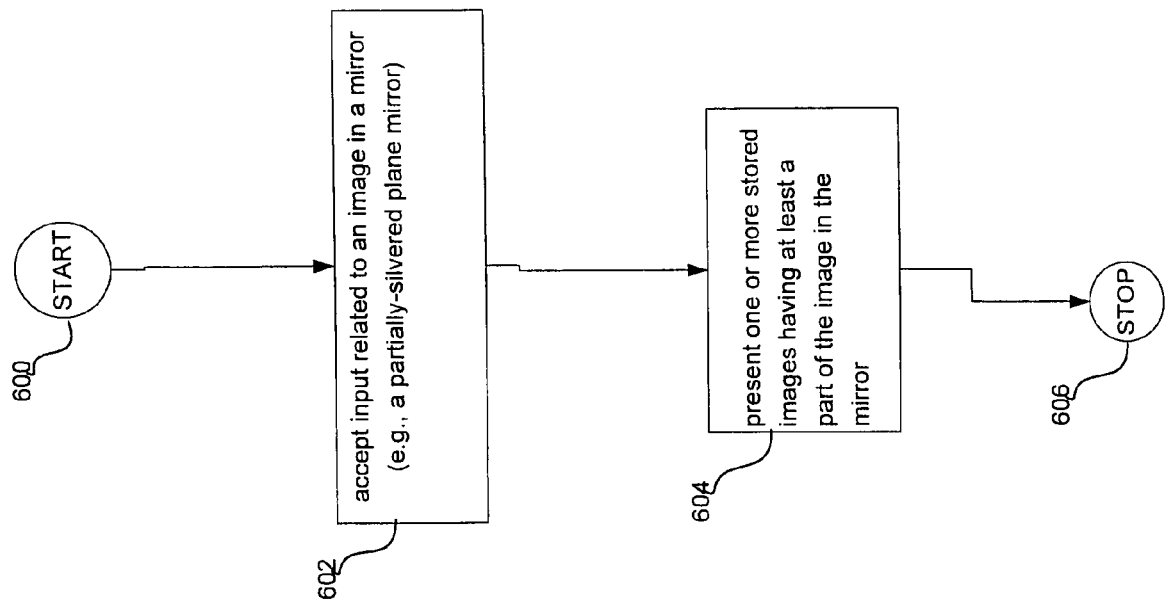
FIG. 6 illustrates a high-level logic flowchart of a process.

Referring now to FIG. 6, illustrated is a high-level logic flowchart of a process. Method step 600 shows the start of the process. Method step 602 shows accepting input related to an image in a mirror (e.g., via captured input storage device 300 and/or its supporting components). Method step 604 depicts presenting one or more stored images having at least a part of the image in the mirror (e.g., such as shown/described in relation to FIG. 5). Method step 606 shows the end of the process. Those skilled in the art will appreciate that, in some implementations, the "at least a part of the image" can include but is not limited to a recognized region of an image or a recognized anchor point associated with an image which will provide the ability to do presentation on regions that both are and are not readily visually coordinated with an original field of view of a mirror. For example, in a hand-held mirror implementation, a user might zoom in on a region of an image and then ask to see a time-lapse sequence of images representative of changes in that zoomed-in region, such that the zoomed-in region is not readily visually coordinated with the original unzoomed field of view of the mirror. The inventors point out that those skilled in the art will appreciate that while the zoomed-in region might not be easily visually coordinated with the un-zoomed field of view, in some implementations the use of anchor points will allow coordination between the zoomed and unzoomed views. In addition, the inventors further point out that while examples set forth herein focus on anatomy and/or anatomical change for sake of clarity, the systems described herein can actually track and/or show a time lapse of substantially any object that may be reflected in the mirror.

Figure 7:
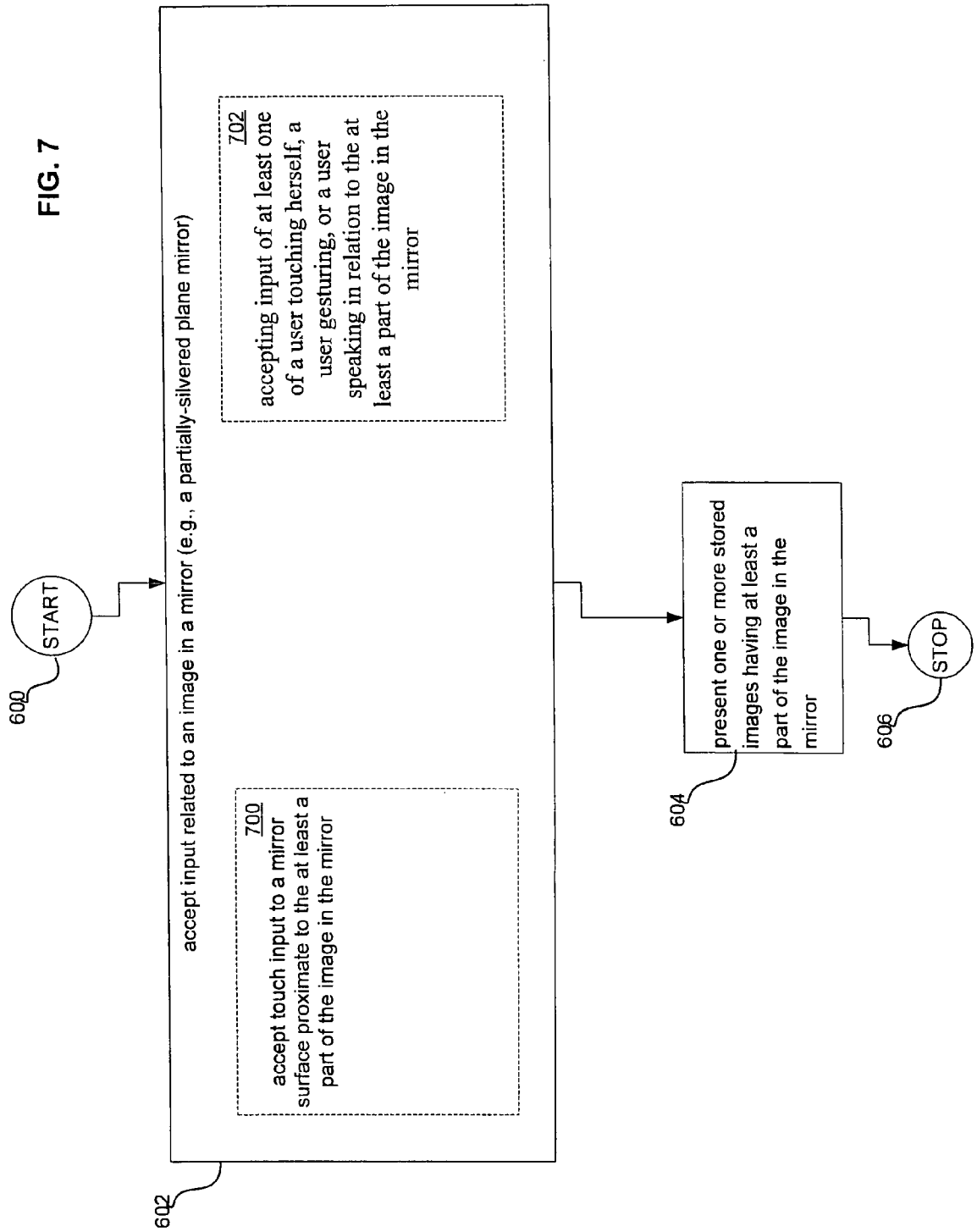
FIG. 7 shows a high-level logic flowchart depicting alternate implementations of the high-level logic flowchart of FIG. 6.

With reference now to FIG. 7, shown is a high-level logic flowchart depicting alternate implementations of the high-level logic flowchart of FIG. 6. Depicted is that in various alternate implementations, method step 602 includes method step 700 and/or method step 702. Method step 700 shows accepting touch input to a mirror surface proximate to the at least a part of the image in the mirror (e.g., via input capture device 104 capturing input when a user's finger is proximate to an image in mirror 100) Method step 702 depicts accepting input of at least one of a user touching herself, a user gesturing, or a user speaking in relation to the at least a part of the image in the mirror (e.g., via input capture device 104 capturing input when a user's gestures or pointing relative to at least a part of an image in mirror 100 and/or the user speaking a command in relation to at least a part of an image in mirror 100).

Figure 8:
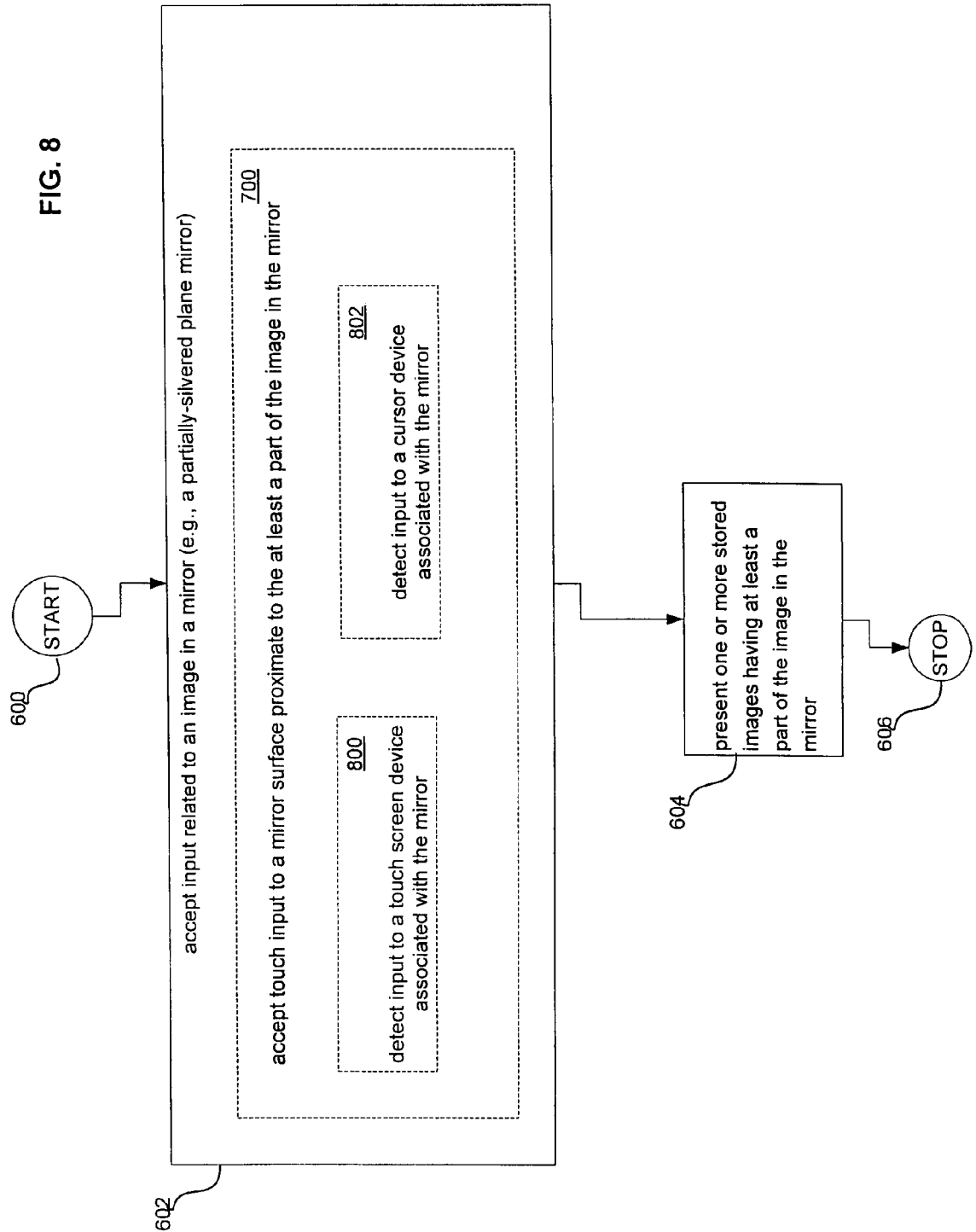
FIG. 8 depicts a high-level logic flowchart depicting alternate implementations of the high-level logic flowchart of FIG. 7.

Referring now to FIG. 8, depicted is a high-level logic flowchart depicting alternate implementations of the high-level logic flowchart of FIG. 7. Depicted is that in one alternate implementation, method step 700 includes method step 800 and/or method step 802. Method step 800 shows detecting input to a touch screen device associated with the mirror (e.g. via mirror 100 and/or input capture device 104 and/or one or more of their supporting components). Method step 802 depicts detecting input to a cursor device associated with the mirror (e.g. via mirror 100 and/or input capture device 104 and/or one or more of their supporting components).

Figure 9:
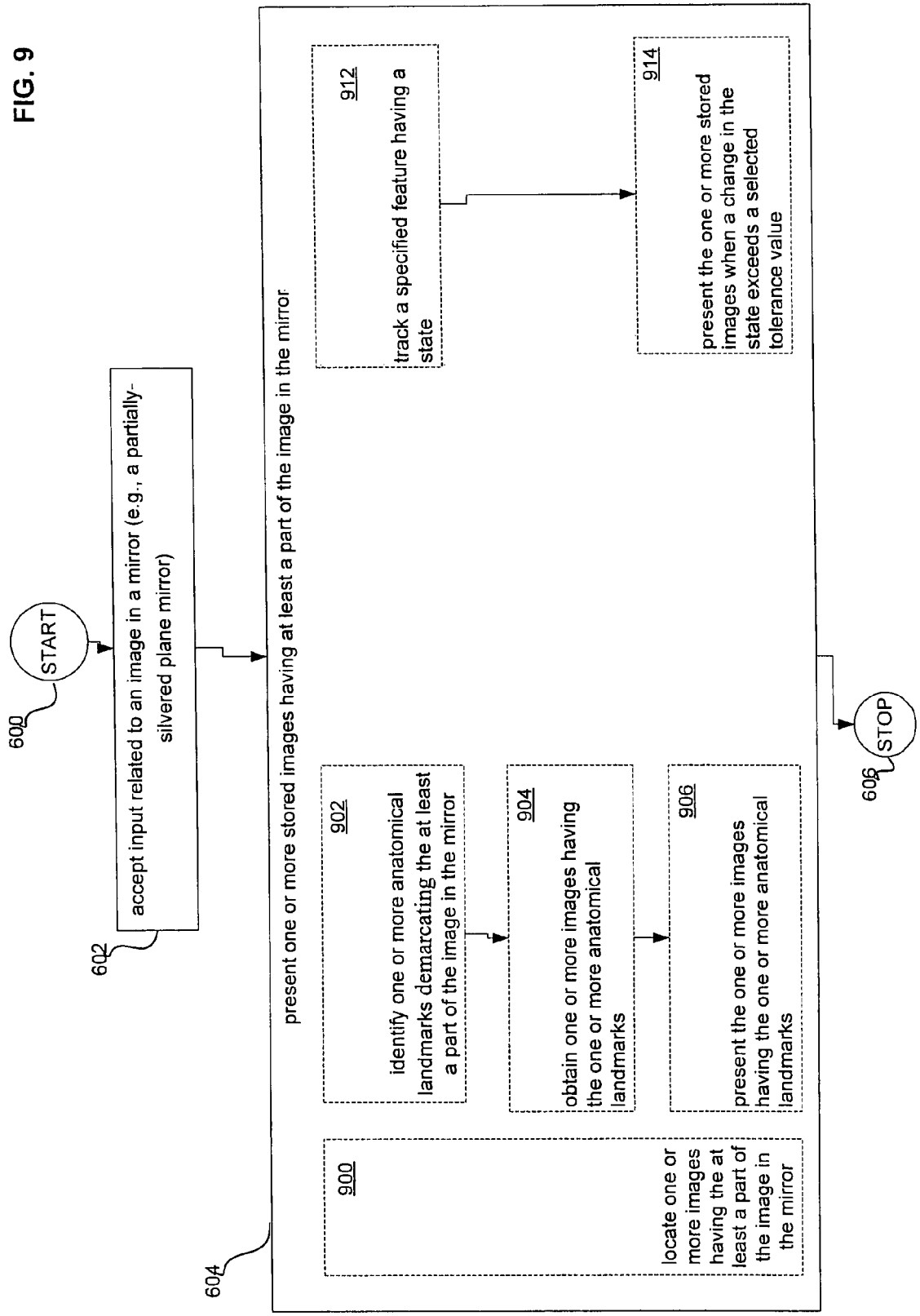
FIG. 9 illustrates a high-level logic flowchart depicting alternate implementations of the high-level logic flowchart of FIG. 6.

With reference now to FIG. 9, illustrated is a high-level logic flowchart depicting alternate implementations of the high-level logic flowchart of FIG. 6. Depicted is that in various alternate implementations, method step 604 includes method step 900, and/or method steps 902-906, and/or method steps 912-914. Method step 900 shows one alternate implementation of locating one or more images having the at least a part of the image in the mirror. For example, locating the one or more images via image sorting engine 200, captured input storage device 300, image recognition engine 302, and/or one or more of image storage devices 202-206.

Continuing to refer to FIG. 9, method steps 902-906 depict another alternate embodiment. Method step 902 illustrates identifying one or more anatomical landmarks demarcating the at least a part of the image in the mirror (e.g., via image sorting engine 200 and/or image recognition engine 302). Method step 904 shows obtaining one or more images having the one or more anatomical landmarks (e.g., via image recognition engine 302 and/or image registration/comparison engine 402). Method step 906 depicts presenting the one or more images having the one or more anatomical landmarks (e.g., via image playback device 106 and/or image sequencing engine 404).

Continuing to refer to FIG. 9, method steps 912-914 illustrate yet another alternate embodiment. Method step 912 shows tracking a specified feature having a state (e.g., via image registration/comparison-engine 402 and/or its supporting components). Method step 914 depicts presenting the one or more stored images when a change in the state exceeds a selected tolerance value (e.g., via image registration/comparison engine 402 and/or image sequencing engine 404 and/or their supporting components).

Figure 10:
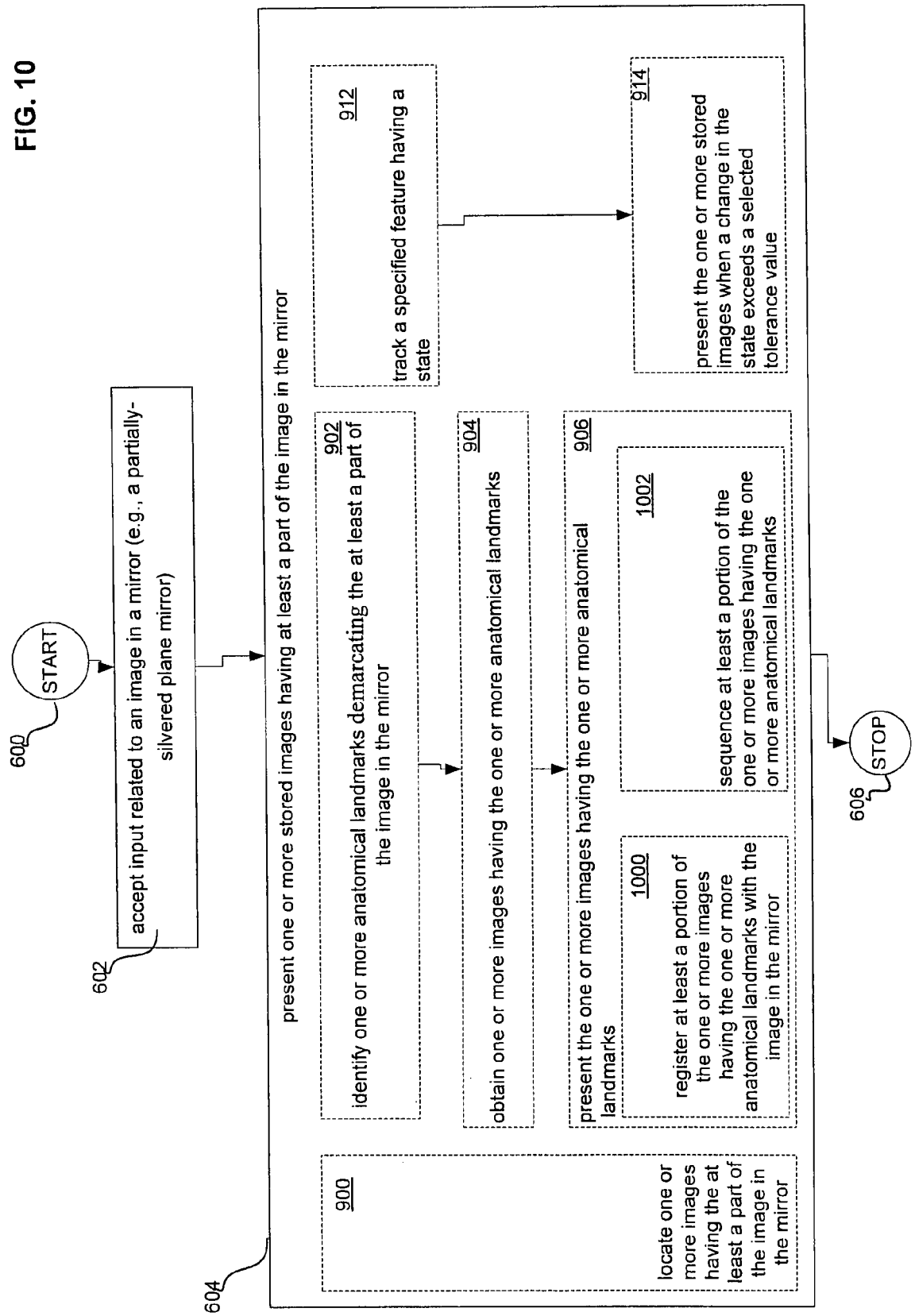
FIG. 10 shows a high-level logic flowchart depicting alternate implementations of the high-level logic flowchart of FIG. 9.

Referring now to FIG. 10, shown is a high-level logic flowchart depicting alternate implementations of the high-level logic flowchart of FIG. 9. Depicted is that in various alternate implementations, method step 906 includes method step 1000 and/or method step 1002. Method step 1000 illustrates registering at least a portion of the one or more images having the one or more anatomical landmarks with the image in the mirror (e.g., via image registration/comparison engine 402). Method step 1002 shows sequencing at least a portion of the one or more images having the one or more anatomical landmarks (e.g., via image sequencing engine 404).

Figure 11:
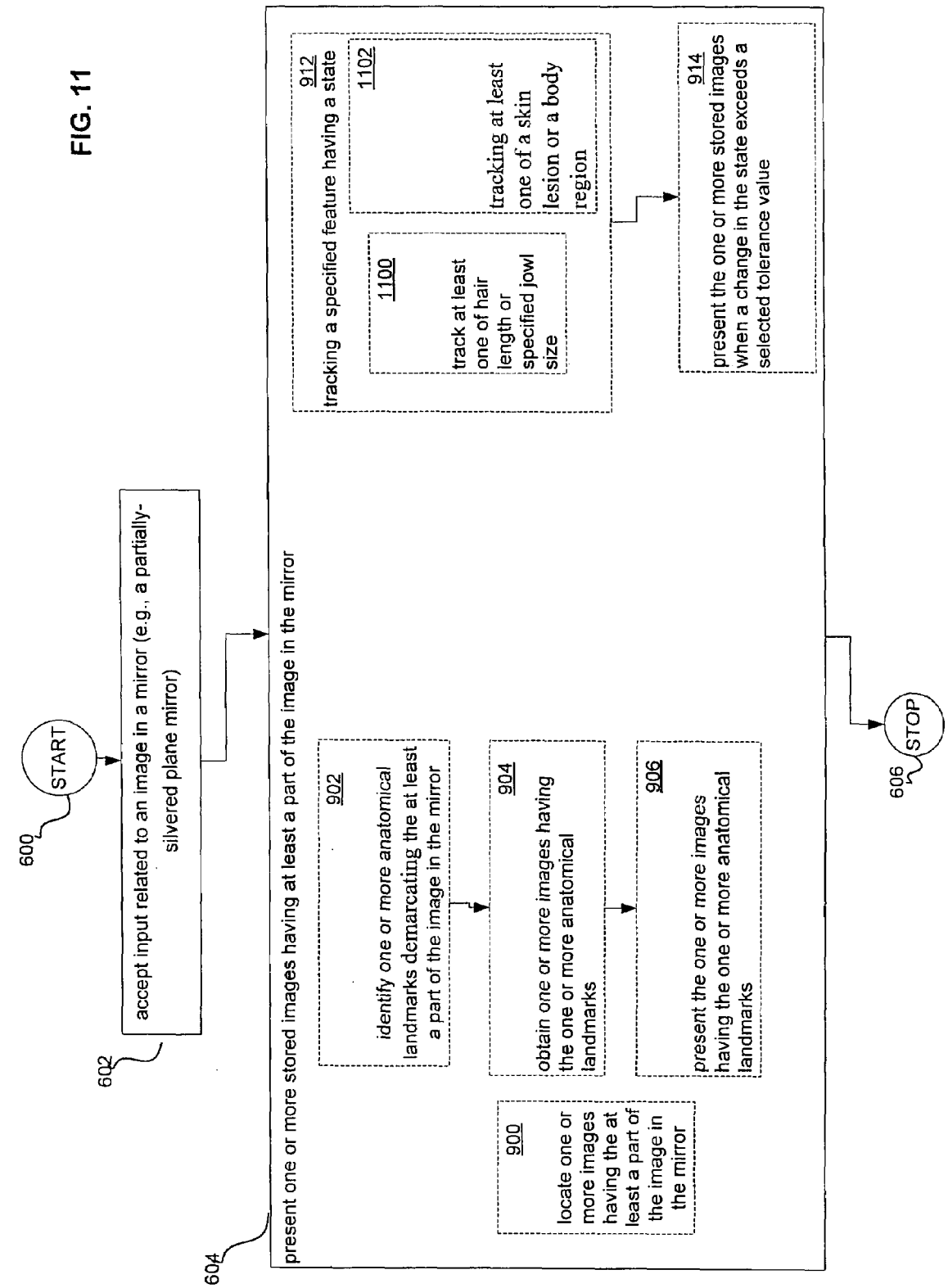
FIG. 11 depicts a high-level logic flowchart depicting alternate implementations of the high-level logic flowchart of FIG. 9.

With reference now to FIG. 11, depicted is a high-level logic flowchart depicting alternate implementations of the high-level logic flowchart of FIG. 9. Illustrated is that in various alternate implementations, method step 912 includes method step 1100 and/or method step 1102. Method step 1100 illustrates tracking at least one of hair length or jowl size (e.g., via image registration/comparison engine 402 and/or its supporting components). Method step 1102 shows tracking at least one of a skin lesion or a body region (e.g., via image recognition engine 302 and/or image registration/comparison engine 402 and/or their supporting components), which the inventors point out is helpful in a handheld mirror implementation.

Figure 12:
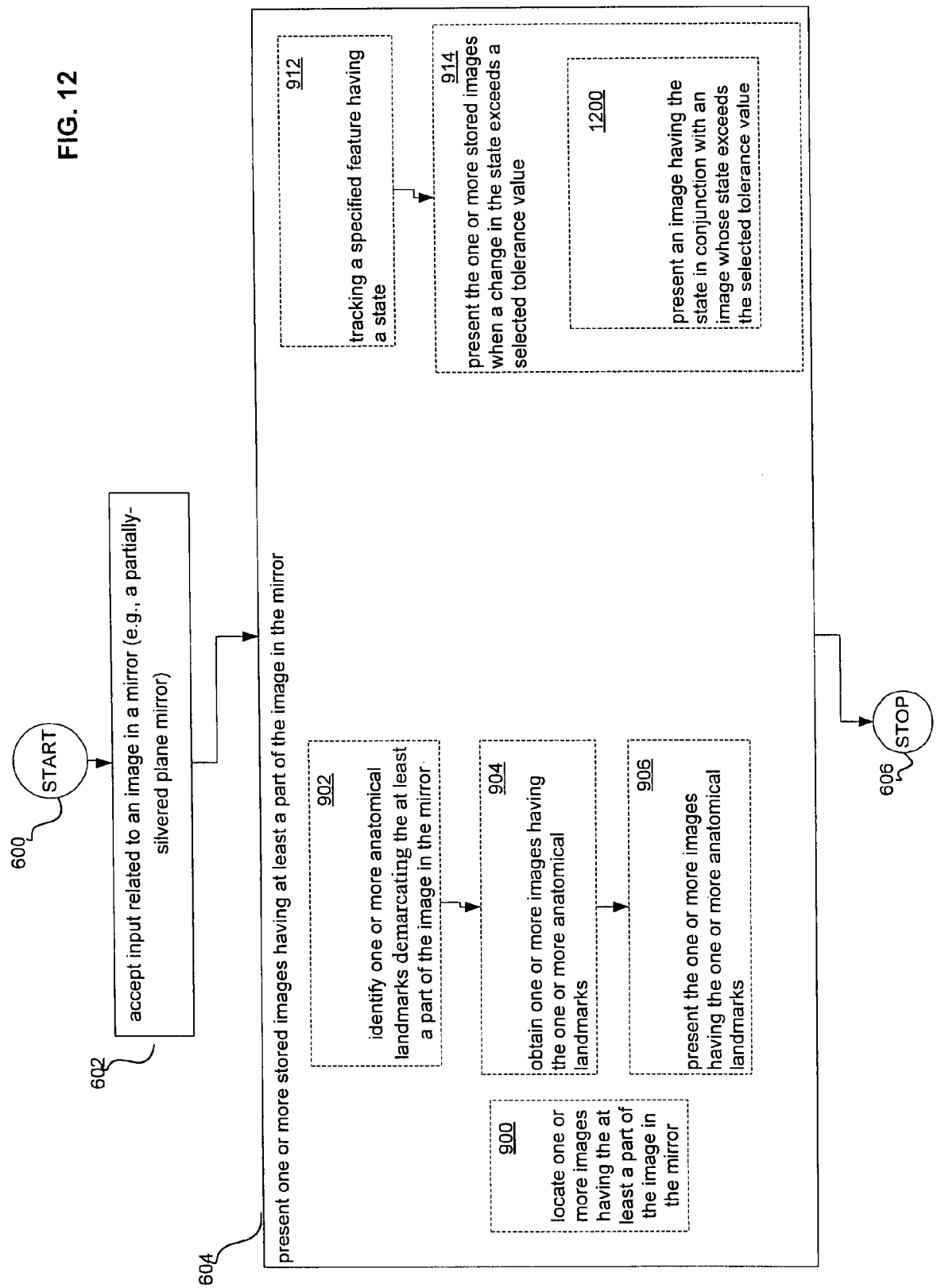
FIG. 12 illustrates a high-level logic flowchart depicting an alternate implementation of the high-level logic flowchart of FIG. 9. The use of the same symbols in different drawings typically indicates similar or identical items.

Referring now to FIG. 12, illustrated is a high-level logic flowchart depicting an alternate implementation of the high-level logic flowchart of FIG. 9. Shown is that in one alternate implementation, method step 914 includes method step 1200. Method step 1200 shows presenting an image having the state in conjunction with an image whose state exceeds the selected tolerance value (e.g., via image recognition engine 302 and/or image registration/comparison engine 402 and/or image sequencing engine 404 and/or their supporting components).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter subject matter described herein are capable of being distributed as a program product in a variety of forms, and that an illustrative embodiment of the subject matter subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

All of the above U.S. patents, U.S. patent application publications, U.S. patent applications, foreign patents, foreign patent applications, and non-patent publications referred to in this specification and/or listed in any Application Data Sheet are incorporated herein by reference, in their entireties.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The invention claimed is:

1. A system comprising:
  a digital mirror;
  an image playback device proximate to said digital mirror;
  an image registration engine operably couplable to said digital mirror, further comprising at least one image capture device operably couplable with said digital mirror, wherein said at least one image capture device further comprises: at least one image representation device located to capture a field of view of said digital mirror; and
  at least one image capture device operably couplable with said digital mirror, wherein
  said at least one image capture device includes:
    at least one image representation device located to capture a field of view of said digital mirror.

2. The system of claim 1, wherein said digital mirror further comprises:
  at least one of a Liquid Crystal display device, a plasma display device, or a laser-diode display device.

3. The system of claim 1, wherein said digital mirror further comprises:
  a handheld mirror.

4. The system of claim 1, wherein said digital mirror further comprises:
  at least one of a bathroom mirror or a hall mirror.

5. The system of claim 1, wherein said digital mirror further comprises:
  a microelectrical mechanical system display device.

6. The system of claim 1, wherein said image playback device proximate to said digital mirror further comprises:

said image playback device operably coupled with said digital mirror.

7. The system of claim 1, wherein said image playback device further comprises:

an image presentation device.

8. The system of claim 1, further comprising:

at least one image storage device operably couplable with said digital mirror.

9. The system of claim 1, further comprising:

at least one image recognition engine operably couplable with said digital mirror.

10. The system of claim 1, further comprising:

at least one image sorting engine operably couplable with said digital mirror.

11. The system of claim 1, wherein said at least one image capture device further comprises:

at least one image representation device alignable relative to a field of view of said digital mirror.

12. The system of claim 1, wherein said at least one image capture device further comprises:

at least two image representation devices alignable relative to a field of view of said digital mirror.

13. The system of claim 1, further comprising:

at least one image registration engine operably couplable with said digital mirror.

14. A system comprising:

a digital mirror;

an image playback device proximate to said digital mirror;

an image registration engine operably couplable to said image playback device, further comprising at least one image capture device operably couplable with said digital mirror, wherein said at least one image capture device further comprises: at least one image representation device located to capture a field of view of said digital mirror; and at least one image capture device operably couplable with said digital mirror, wherein said at least one image capture device includes:

at least one image representation device located to capture a field of view of said digital mirror.

* * * * *